United States Patent [19]

Kennedy et al.

[11] Patent Number: 5,062,514
[45] Date of Patent: Nov. 5, 1991

[54] INSULATING RETAINER FOR A VISCOUS FLUID CLUTCH

[75] Inventors: Lawrence C. Kennedy, Kettering; Harvey J. Lambert, West Milton, both of Ohio

[73] Assignee: General Motors Corporation, Detroit, Mich.

[21] Appl. No.: 688,796

[22] Filed: Apr. 22, 1991

[51] Int. Cl.⁵ .............................................. F16D 35/02
[52] U.S. Cl. .................................. 192/82 T; 192/58 B
[58] Field of Search ................................ 192/82, 58 B

[56] References Cited

U.S. PATENT DOCUMENTS

| | | | |
|---|---|---|---|
| 4,103,765 | 8/1978 | Tinholt | 192/58 B |
| 4,190,139 | 2/1980 | Tinholt et al. | 192/82 T X |
| 4,190,140 | 2/1980 | Konkle et al. | 192/82 T |
| 4,302,156 | 11/1981 | LaFlame | 192/58 B X |
| 4,310,085 | 1/1982 | LaFlame | 192/58 B |
| 4,328,881 | 5/1982 | Rohrer | 192/58 B |
| 4,583,625 | 4/1986 | Hayashi et al. | 192/58 A |
| 4,633,988 | 1/1987 | Light | 192/58 B |
| 4,735,300 | 4/1988 | Brown | 192/58 B |
| 4,949,825 | 8/1980 | Light | 192/58 B |
| 4,998,607 | 3/1991 | Mizutani et al. | 192/58 B |

Primary Examiner—Allan D. Herrmann
Assistant Examiner—Nicholas Whitelaw
Attorney, Agent, or Firm—A. Michael Tucker

[57] ABSTRACT

A viscous fluid clutch having a bimetallic coil includes an insulating retainer. A body of the retainer is mounted between the coil and an outer surface of the clutch housing. A flexible tab on the retainer is placed between a first end of the coil and a slot on the clutch housing to provide an interference fit and eliminate the need for adhesives. The body inhibits the transfer of radiant heat emanating from fluid inside the clutch to the coil. Preferably, the body and tab are integrally formed.

11 Claims, 2 Drawing Sheets

INSULATING RETAINER FOR A VISCOUS FLUID CLUTCH

BACKGROUND OF THE INVENTION

1. Field of the Invention

The present invention relates generally to a viscous fluid drive device In particular, the present invention is concerned with an insulating retainer for mounting a bimetallic coil on a fan clutch.

2. Statement of the Related Art

A thermostatically-controlled viscous fluid clutch assembly for driving and rotating a vehicle cooling fan is well-known. A multi-bladed fan is removably secured to a body of the clutch. The fan and clutch assembly are installed between an accessory pulley (typically the water pump pulley) of a vehicle engine and a radiator. The clutch drives the fan at high speeds close to input speed when cooling is required and permits the fan to rotate at low speeds when cooling is not required. Thermostatic control of the fan through the clutch reduces airflow noise caused by fan rotation and the load on an engine, resulting in horsepower gain and improved fuel economy.

Bimetallic coils are often utilized to sense ambient air temperature in an engine compartment and engage or disengage the clutch. A coil expands and contracts in response to air temperatures and controls fluid flow inside the clutch in a well-known manner.

A conventional assembly method for a coil includes inserting a first end of the coil in a slot on the clutch housing and inserting a second end of the coil in a slot of a rotatable control shaft. Vibrations incurred by the clutch require an adhesive to secure and hold the first end of the coil on the cover. Due to the clutch's environment, a room-temperature vulcanizing (RTV) silicone is applied in the slot. While the RTV silicone holds the first end, various drawbacks exist, including a lengthy cure time and frequent maintenance and clogging of the tooling and nozzles used to apply the silicone.

The bimetallic coil is designed to control a cooling fan in response to air temperatures in the engine compartment. However, friction in a clutch can be great, and fluids for clutches are designed to operate for temperatures as high as 350° F. The heated fluid contained in a clutch produces radiant heat which can affect the operation of the bimetallic coil.

The art continues to seek improvements. It is desirable to control clutch and fan rotation with a bimetallic coil. Additionally, it is desirable to eliminate costly RTV silicone for retaining a coil on a clutch. Coil operation can be improved if a coil can be insulted from radiant heat emanating from fluid contained in the clutch.

SUMMARY OF THE INVENTION

The present invention includes an improved viscous fluid drive device particularly suitable for a fan clutch of a vehicle. The present fan clutch includes an insulating retainer mounted between a bimetallic coil and the clutch housing. A flexible tab on the retainer provides an interference fit to mount one end of the coil and eliminate RTV silicone or other adhesives. The non-conductive property of the retainer inhibits radiant heat flow from the cover to the coil. The present insulating retainer is economical to manufacture and can be adapted for conventional clutches.

In a preferred embodiment, a viscous fluid clutch having a bimetallic coil includes an insulting retainer. A body of the retainer is mounted between the coil and an outer surface of the clutch housing. A flexible tab on the retainer is placed between a first end of the coil and a slot on the clutch housing to provide an interference fit and eliminate the need for adhesives. The body inhibits the transfer of radiant heat emanating from fluid inside the clutch to the coil. Preferably, the body and tab are integrally formed.

DETAILED DESCRIPTION OF THE PREFERRED EMBODIMENT

Figure 1:
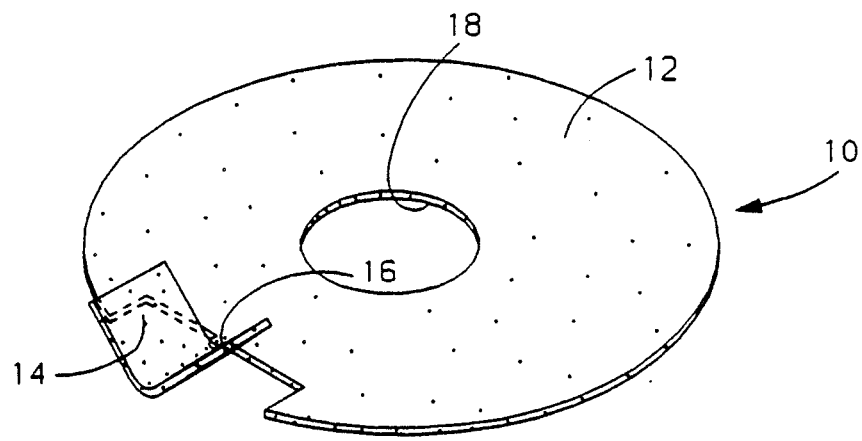
FIG. 1 is a perspective view of a preferred embodiment of the present insulating retainer illustrating a V-shaped tab projecting upwardly from the plane of the retainer.

A preferred embodiment of the present insulating retainer is indicated generally at 10 in FIG. 1. The retainer 10 includes a generally disc-shaped or circular body 12 formed from a flexible material having heat insulating properties. Various non-conductive materials, including phenolic compounds, polyester films and plastics, can be utilized for the body 12.

A generally rectangular tab 14 is formed near the outer periphery of the body 12. Preferably, the tab 14 is cut in the body 12 and remains connected by an uncut stem 16. After formation, the tab 14 is bent to form a V-shape projecting upwardly from the plane of the body 12. A central opening 18 is provided in the body 12.

Preferably, the body 12, tab 14 and stem 16 are integrally formed. More preferably, the body 12, tab 14 and stem 16 are molded from a suitable material.

Figure 3:
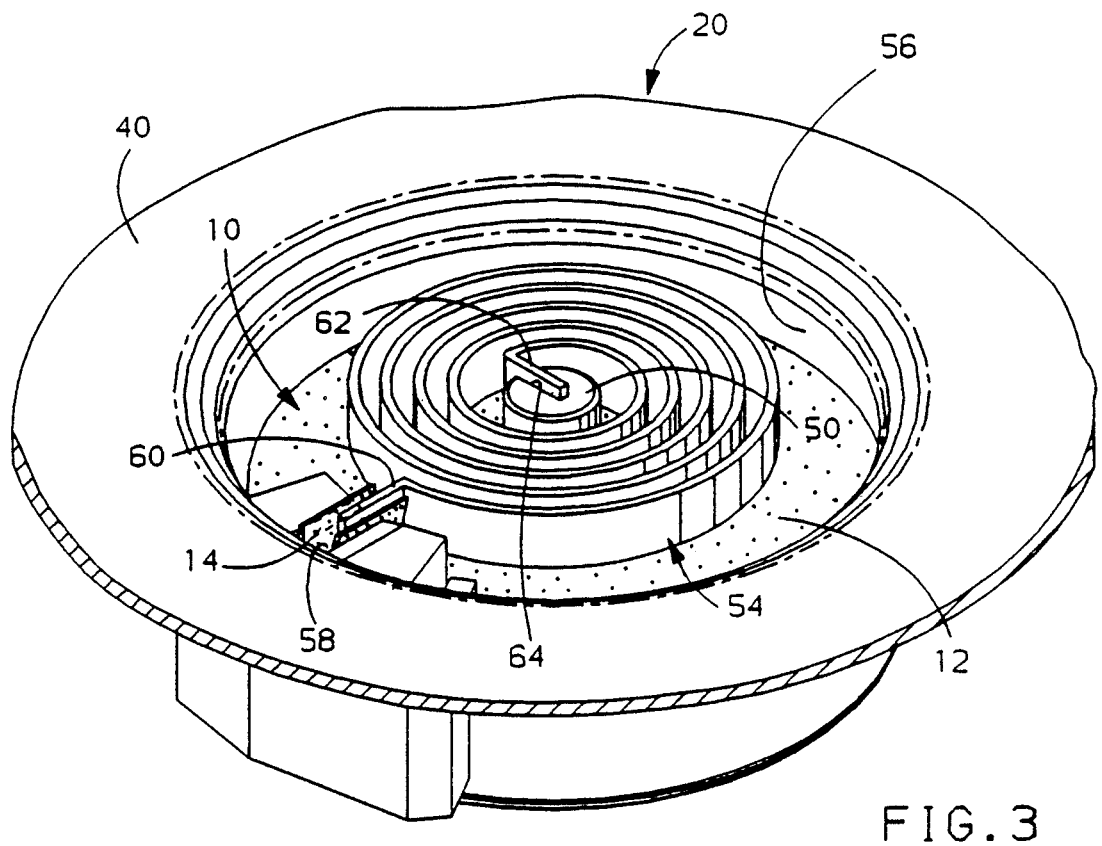
FIG. 3 is a fragmentary perspective view of the outer surface of the clutch of FIG. 2 illustrating the retention of one end of the bimetallic coil by the V-shaped tab of the retainer.
Figure 2:
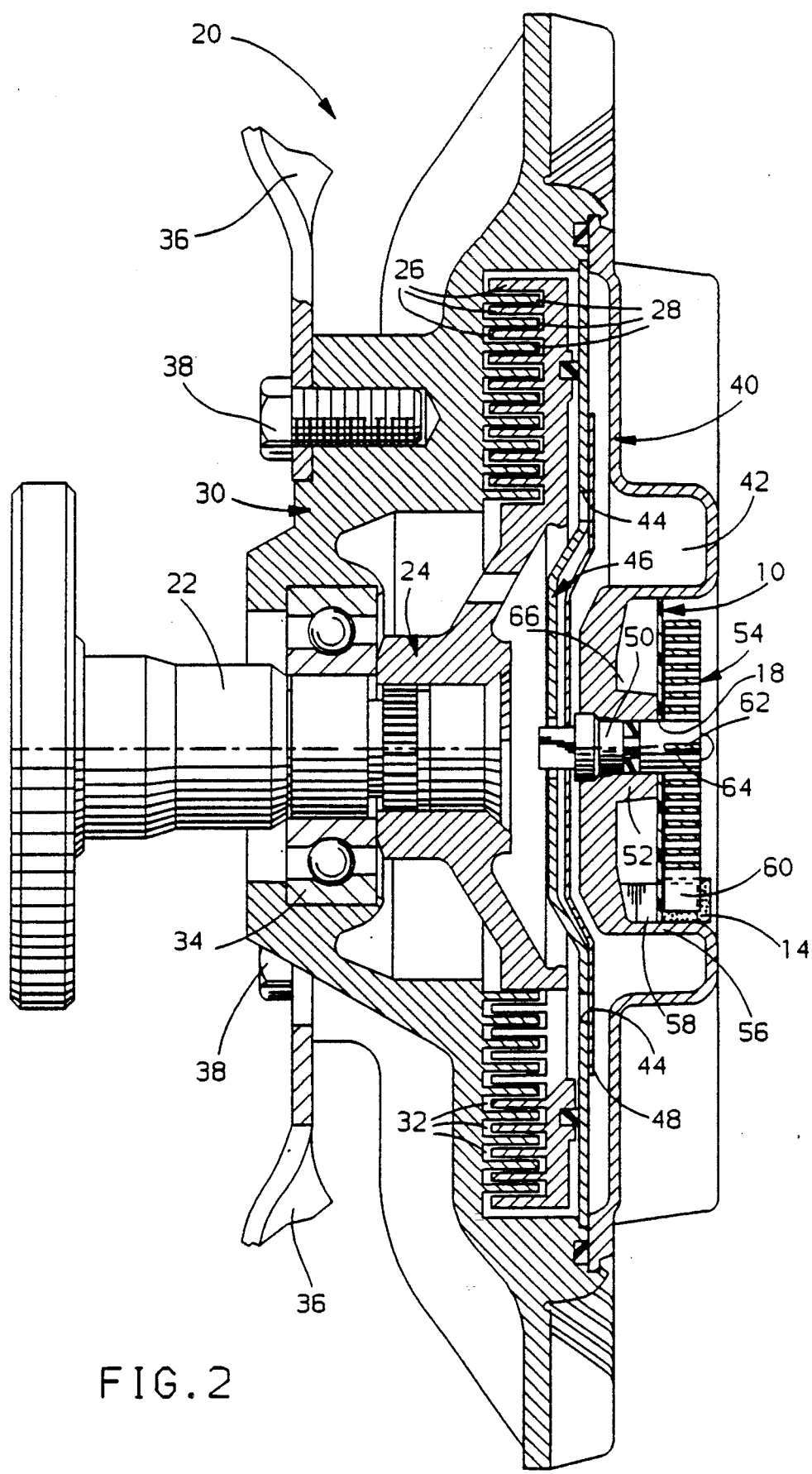
FIG. 2 is a sectional view of the viscous fluid clutch illustrating the insulating retainer of FIG. 1 mounted between a bimetallic coil and an outer surface of a cover of the viscous fluid clutch.

FIGS. 2 and 3 illustrate a conventional viscous fluid clutch 20 incorporating an insulating retainer 10. The clutch 20 includes an input shaft 22 drivingly connected to a clutch plate 24. Ridges 26 of the clutch plate 24 are interleaved with ridges 28 of a housing 30 to form a fluid shear zone 32. The housing 30 is rotatably mounted on the input shaft 22 by a bearing set 34. A fan 36 is secured to the housing 30 by threaded fasteners 38. Fluid shear in the shear zone 32 drives the housing 30 and attached fan 36 in a well-known manner.

A cover 40 is secured to the housing 30 and forms a fluid reservoir 42. Control of fluid from the reservoir 40 through inlets 44 in a pump plate 46 is performed by a rotatable control arm 48. The control arm 48 is drivingly secured to a shaft 50 which projects through a hub 52 in the cover 40. A well-known bimetallic coil indicated generally at 54 is connected to and rotates the shaft 50 and control arm 48 in response to ambient air temperature. An increase in air temperature causes the coil 54 to expand, thereby rotating the shaft 50 and the control arm 48 to uncover the inlets 44 in the pump plate 46. Fluid travels from the reservoir 42 to the shear zone 32 and transmits input torque from the clutch plate 24 to the housing 30 and the fan 36. When the air temperature has decreased to a predetermined level, the coil 54 contracts, causing the shaft 50 and control arm 48 to rotate back to their original positions, thereby covering the inlets 44 and blocking fluid flow.

The retainer 10 is fitted onto the cover 40 as the control shaft 50 is received through the central opening 18. Preferably, the circumference of the retainer 10 is complementary to the receiving portion of the cover 40. As shown best in FIG. 3, the present cover 40 includes an annular wall 56 which cooperates to form the reservoir 42. A slot 58 is formed in the outer surface of the annular wall 56. As the retainer 10 is fitted over the shaft 50, the V-shaped tab 14 is fitted into the slot 58. A first end 60 of the coil 54 is then pressed into the tab 14 so that an interference fit results to retain the first end 60 in the slot 58. The second end 62 of the coil 54 is fitted into a slot 64 on the shaft 50. Once the ends 60,62 of the coil 54 are fitted, expansion and contraction of the coil 54 rotates the shaft 50 as described above.

Preferably, the outer circumference of the retainer 10 is press fitted against the annular wall 56. An air gap 66 (FIG. 2) is provided between an inner surface of the retainer 10 and an outer surface of the cover 40. The air gap 66 inhibits radiant heat transfer from fluid in the reservoir 42 through the cover 40 to the retainer 10. The insulative and non-conductive properties of the retainer 10 further inhibit radiant heat transfer to the coil 54.

The size and thickness of the tab 12 are selected to provide the interference fit between first end 60 of the coil 54 and the slot 56. The interference fit eliminates the need for previously-used adhesives.

It is appreciated that the size and shape of the retainer 10 can be modified to accommodate the cover 40 of a clutch 20. In some applications, it may be desirable to expand the area of the retainer 10 to cover a greater portion of the outer surface of the cover 40. Furthermore, it may be desirable in some instances to provide a body 12 of insulative properties without a tab 14, while in other cases a retainer 10 for the coil 54 may not require an insulative body 12.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A viscous fluid clutch comprising:
   (a) a housing;
   (b) a bimetallic coil mounted on the housing for controlling clutch rotation; and
   (c) insulating means mounted between the housing and the bimetallic coil for inhibiting radiant heat transfer from inside the housing to the bimetallic coil.

2. The clutch specified in claim 1 including tab means formed on the insulating means for securing a first end of the coil to the housing by creating an interference fit.

3. The clutch specified in claim 2 wherein the insulating means and tab means are integrally formed.

4. The clutch specified in claim 3 wherein the insulating means and tab means are integrally molded.

5. The clutch specified in claim 2 wherein the tab means comprises a flexible V-shaped tab connected to the insulating means by a stem.

6. A retainer for mounting an end of a bimetallic coil in a slot on a housing of a viscous fluid clutch, the retainer comprising:
   (a) a body fitted between the coil and the housing; and
   (b) tab means integrally formed on the body and fitted in the slot to provide an interference fit between the end of the coil and the slot.

7. The retainer specified in claim 6 wherein the body is formed from an insulating material.

8. The retainer specified in claim 6 wherein the body and the tab means are integrally molded.

9. The retainer specified in claim 6 wherein the tab means comprises a flexible V-shaped tab projecting upwardly from a plane of the body and connected to the body by a stem.

10. The retainer specified in claim 6 wherein the body is press-fitted into a receiving portion of the housing.

11. The retainer specified in claim 6 wherein an air gap is provided between the body and the housing.

* * * * *